Figures 1, 2:
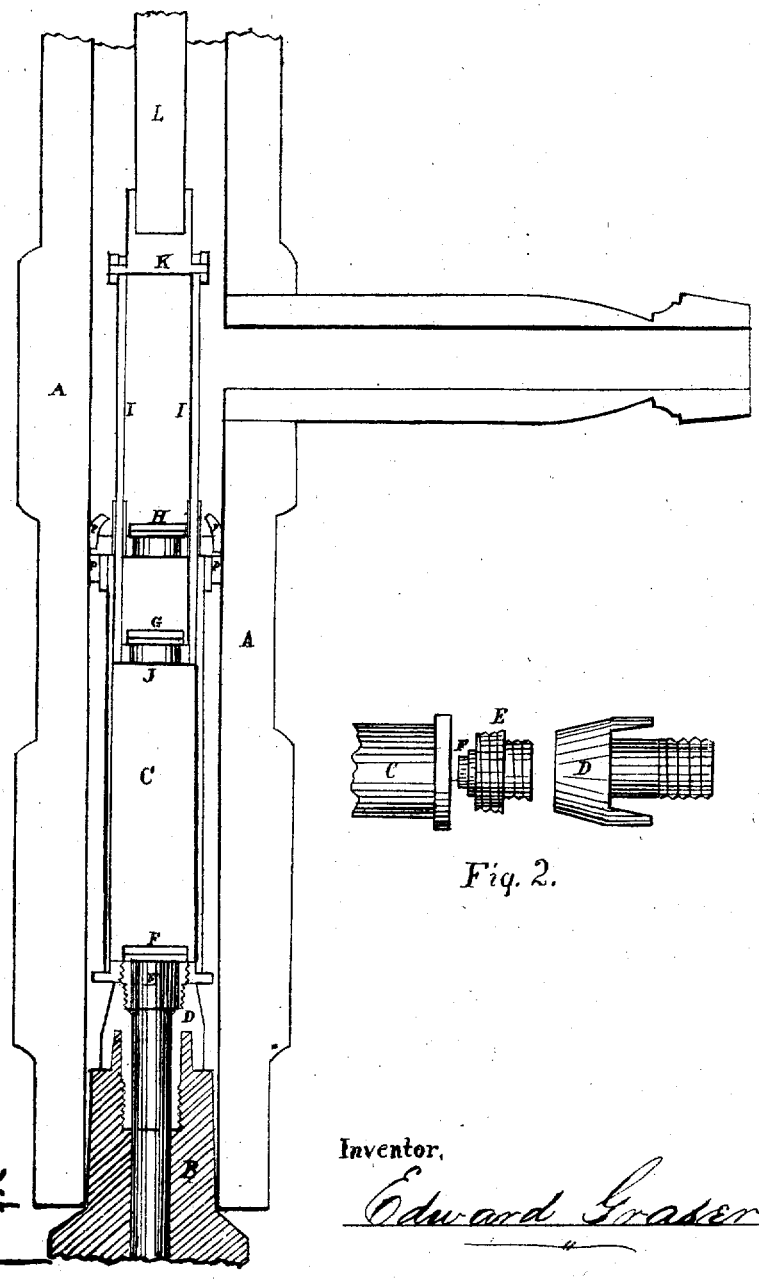

EDWARD GRASER.

Pump.

No. 5,396. Reissued May 6, 1873.

Witnesses,
Jno. H. Wallock
A. B. Tice

Inventor,
Edward Graser

AM. PHOTO-LITHOGRAPHIC CO. N.Y. (OSBORNE'S PROCESS)

UNITED STATES PATENT OFFICE.

EDWARD GRASER, OF UNION CITY, PENNSYLVANIA.

IMPROVEMENT IN PUMPS.

Specification forming part of Letters Patent No. 124,434, dated March 12, 1872; reissue No. 5,396, dated May 6, 1873; application filed March 5, 1873.

*To whom it may concern:*

Be it known that I, EDWARD GRASER, of Union City, in the county of Erie and State of Pennsylvania, have invented a new Improvement in Pumps; and I do hereby declare the following to be a full, clear, and exact description of the same, reference being had to the accompanying drawing and to the letters of reference marked thereon.

The object of my invention is to provide a pump from which the lower valve can be removed without taking up the pump from the well, and also to provide a superior pump.

The following is a description of the accompanying drawing.

Figure 1 is a vertical sectional view of a pump, showing my device therein. Fig. 2 is a portion of my invention detached from the pump.

My device consists of the following parts, as shown by the letters of reference.

A is the pump-log, and B is the lower section of log. C is the pumping-cylinder, which is constructed of sheet or cast metal, as may be desired. Its upper end may be provided with packing P P. It is provided with a piston, J, and piston-rods I I, which are attached at K by a pivot-bolt to the plunger-rod L. In the upper end of the cylinder is a valve, H, and the piston J is provided with a valve, G. Into the lower end of the cylinder is screwed a valve-seat for the valve F, which is the lower valve of the pump. This valve-seat is provided with a screw, E, which will hereafter be more fully mentioned. The valve-seat is shown in this case as being removable, and this is the form of construction used by me. This screw E is a male screw and enters the female screw in D, which is a metallic tip, and can be attached to the lower log.

It will be observed that all the valves are within or attached to the cylinder C, and that this is so constructed as to be easily adjusted to or removed from the tip D. The operation of pumping when the cylinder is attached to the tip D is the same as in an ordinary pump.

When, by accident or derangement of any kind, the valve F, or either of the valves, becomes inoperative or operates imperfectly the manner of removing the same is as follows: The handle of the pump is removed from its fulcrum, or else detached from the plunger L. This allows the plunger to be revolved, and this, as there are two piston-rods, I I, or some similar arrangement which will give a purchase sufficient, revolves the cylinder C, which will unscrew the part E from D. When this is done the cylinder can at once be removed from the pump, and the valve F can be removed from the cylinder and be repaired. When the cylinder is to be replaced in the pump it is lowered to position and a few turns screws it fast to the tip D, and it is ready for operation.

What I claim as new, and desire to secure by Letters Patent, is as follows:

The cylinder C, constructed substantially as described, and provided with the screw E and tip D, or their equivalents, in combination with the piston J and plunger-rod L, substantially as shown and described, and for the purposes mentioned.

Attest: EDWARD GRASER.

JNO. K. HALLOCK,

W. E. LATHY.